March 6, 1956 — S. F. HUTCHINS — 2,737,101
GARDEN CULTIVATOR AND WEEDER
Filed Oct. 20, 1950 — 2 Sheets-Sheet 1
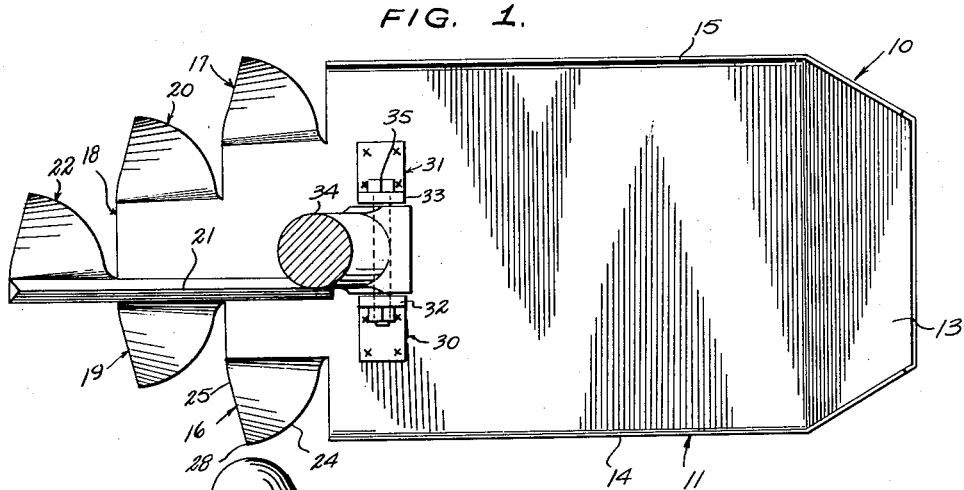
INVENTOR.
SAMUEL F. HUTCHINS,
BY
McMorrow, Berman + Davidson
ATTORNEYS.

March 6, 1956  S. F. HUTCHINS  2,737,101
GARDEN CULTIVATOR AND WEEDER
Filed Oct. 20, 1950  2 Sheets-Sheet 2
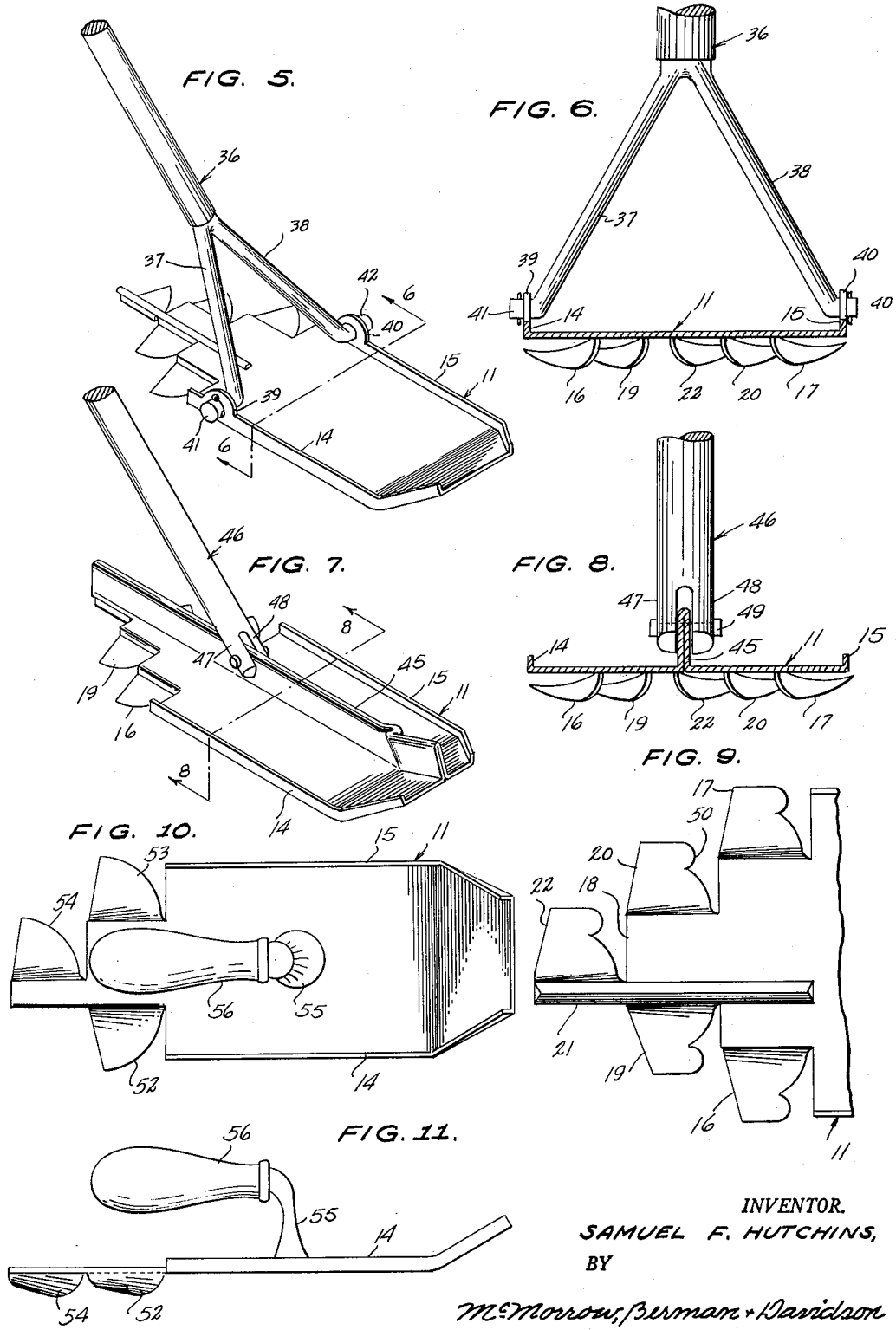
INVENTOR.
SAMUEL F. HUTCHINS,
BY
McMorrow, Berman & Davidson
ATTORNEYS.

United States Patent Office 2,737,101
Patented Mar. 6, 1956

2,737,101

GARDEN CULTIVATOR AND WEEDER

Samuel F. Hutchins, Norfolk, Va.

Application October 20, 1950, Serial No. 191,159

3 Claims. (Cl. 97—63)

This invention relates to earth-working equipment, and more particularly to a garden cultivator and weeder.

An object of this invention is to provide a garden cultivator and weeder which is particularly adapted to cultivate earth strata contiguous to and spaced below the surface of the earth to be worked.

Another object of this invention is to provide a garden cultivator and weeder in which the cultivation takes place in planes substantially parallel to and spaced below the surface of the earth being worked.

A further object of this invention is to provide a garden cultivator and weeder which is particularly adapted to cut and destroy small weeds and grass of the type usually found in gardens and flower beds.

A still further object of this invention is to provide a garden cultivator and weeder including a novel shovel which is particularly adapted to remain unfouled during use.

A still further object of this invention is to provide a garden cultivator and weeder which is relatively simple in structure and cheap to manufacture.

The above and still further objects and advantages of the present invention will become apparent upon consideration of the following detailed description of a specific embodiment of the invention when take in conjunction with the drawings, wherein:

Figure 1 is a top plan view, with parts broken away and shown in section, of a garden cultivator and weeder of the present invention;

Figure 2 is a side elevational view, with parts broken away and shown in section, of the garden cultivator shown in Figure 1;

Figure 3 is a sectional view taken along the line 3—3 of Figure 2;

Figure 4 is a perspective view of the garden cultivator;

Figure 5 is a perspective view, with parts broken away and shown in section, of a modified form of the garden cultivator of the present invention;

Figure 6 is a sectional view taken substantially along the line 6—6 of Figure 5;

Figure 7 is a perspective view, with parts broken away and shown in section, of another modified form of the garden cultivator and weeder of the present invention;

Figure 8 is a sectional view taken substantially along the line 8—8 of Figure 7;

Figure 9 is a fragmentary top plan view of still another modified form of the garden cultivator and weeder of the present invention;

Figure 10 is a top plan view of still another modified form of the garden cultivator and weeder of the present invention; and Figure 11 is a side elevational view of the modified garden cultivator and weeder shown in Figure 10.

Referring now more particularly to the drawings, wherein like reference numerals have been used throughout the several views to designate like parts, there is shown in Figures 1 to 4, inclusive, one form of the garden cultivator of the present invention, generally designated by the reference numeral 10.

The cultivator and weeder 10 embodies a shoe 11 including a plane rectangular plate 12 which has one end tapered and turned upwardly, as designated by the reference numeral 13, and cooperating with the plate 12 to form a sled adapted to slide upon the surface of the earth to be worked. The side edges of the plate 12 are turned upwardly to form marginal flanges 14 and 15 to strengthen the shoe 11.

Secured to, or formed integrally with the end of the plate 12 remote from the tapered end 13 is a pair of forward ground-engaging shovels 16 and 17 which are spaced outwardly of the longitudinal center line of the plate 12 and are supported on the extension 18. Spaced inwardly of the forward shovels 16 and 17 is a pair of rear shovels 19 and 20 which are supported on, or formed integrally with, the base extension 18. Disposed longitudinally of the extension 18 is a reinforcing bar 21 which is secured to the extension 18 and has one end projecting rearwardly of the shovels 19 and 20. Disposed between the shovels 19 and 20 of the second pair is a shovel 22 which is supported on the projecting end of the bar 21 rearwardly of the aforementioned shovels.

Since the structure and arrangement of each of the shovels is the same, it will suffice to describe only one in detail. For example, the shovel 16 which is of triangular shape and is disposed transversely of the extension 18 and has a leading edge 24 spaced below the plate 12 and has a trailing edge 25 spaced below the plate 12, whereby, upon movement of the shoe 11 over the earth to be worked, the cultivator shovel 16 cultivates a path in an earth stratum spaced below the ground surface. The cultivator shovel 16 includes an end portion 26, Figure 3, which is secured to or formed integrally with the extension 18 and is disposed at right angles with respect to the extension. The shovel further embodies an intermediate portion which is bent upwardly and outwardly toward the free end thereof and terminates in an outwardly projecting wing 27. Upon consulting Figure 1, it is noted that the leading and trailing edges of the shovel 16 converge toward each other and terminate at a point 28 spaced below the plane bottom 12 of the base 11. The shovels 16, 17, 19, 20 and 22 cooperate to cultivate a swath of the earth upon movement of the base thereover, the width of the swath being predetermined by the spacing between the shovels 16 and 17 of the first-named pair.

Disposed contiguous to the end of the base 11 remote from the turned-up end 13 are the right-angled brackets 30 and 31, each of which has one leg abutting against and secured to the base 11. The extending legs 32 and 33 of the right-angled brackets 30 and 31 are disposed in spaced parallel relations with respect to each other and support therebetween the adjacent end of a handle 34 which is mounted for rocking movement about an axis transverse of the base 11 by means of the bolt 35 which extends through the upstanding legs 32 and 33 and the adjacent end of the handle 34. It is to be noted that the handle is secured close to the cultivating shovels and spaced rearwardly of the center of mass of the base 11, to thereby provide greater control for the operator while effecting the movement of the base over the ground surface.

In Figures 5 and 6 there is shown a modified form of the garden cultivator and weeder in which the handle 34 and brackets 30 and 31 are omitted and replaced by the handle 36 including the downwardly divergent arms 37 and 38 and the upstanding ears 39 and 40 formed integrally with or secured to the flanges 14 and 15 of the base 11. The free ends of the downwardly divergent arms 37 and 38 of the handle 36 are turned outwardly to form stub shafts 41 and 42 each rotatably journaled in the adjacent one of the upstanding ears 39 and 40.

In Figures 7 and 8 there is shown another modified form of the cultivator and weeder of the present invention in which the base 11 is formed with an upstanding, longitudinally extending flange 45 which provides a support for the handle 46 and imparts additional rigidity to the base 11. It is to be noted that the cultivating shovel 22, which was supported on the projecting end of the brace bar 21, can be supported on the rear end of the upstanding flange 45. The lower end of the handle 46 is bifurcated to form depending legs 47 and 48 which are adapted to overlie opposite sides of the upstanding flange 45. Straddling the assembly of the legs 47 and 48 and the upstanding flange 45 is a bolt 49 which rotatably journals the handle 46 for rocking movement about an axis extending transversely of the base 11.

In Figure 9 there is shown a modification of the cultivating shovels 16, 17, 19, 20 and 22 in which the leading edges of the shovels are redesigned to give better weeding properties. Each of the leading edges is provided with a substantially V-shaped notch, generally designated by the reference numeral 50, which is disposed intermediate the ends of the leading edge and facilitates grasping weeds and the like during movement of the base 11 over the ground to be worked. It is to be noted that the modified shovel illustrated in Figure 9 may be employed with any of the embodiments of the garden cultivator and weeder of the present invention.

In Figures 10 and 11 there is shown a garden cultivator and weeder constructed according to the present invention which is particularly adapted to be manually actuated and to cultivate a relatively narrow swath of ground. In the modification illustrated, only three cultivating shovels are employed, the shovels being designated by the reference numerals 52, 53 and 54. The shovels 52 and 53 are spaced outwardly of the longitudinal center line of the base 11, while the cultivator shovel 54 is disposed intermediate the cultivator shovels 52 and 53 and supported rearwardly thereof on the base extension. The cultivator shovels 52, 53 and 54 cooperate to cultivate a path of a width defined substantially by the distance between the outermost points of the shovels 52 and 53. Carried by the base 11 is an upstanding shank 55 which supports a handle 56 which is disposed in spaced, parallel relation with respect to and above the base 11.

From the foregoing it is readily apparent that numerous other modifications of the cultivator shovel of the present invention can be made without departing from the spirit of the invention as set forth in the appended claims.

What I claim is:

1. In a garden cultivator and weeder, a generally rectangular shoe plate adapted to slide over the surface of the ground and having longitudinal side edges, said shoe plate having a forward end and a rearward end, a longitudinal extension on the rearward end of said shoe plate, said extension being narrower than said shoe plate and having side edges spaced laterally inwardly from the side edges of the shoe plate, shovels on said side edges of said extension, said shovels having convexly and rearwardly curved forward edges and relatively straight rearward edges, said shovels projecting laterally outwardly from the side edges of the extension, said shovels being laterally outwardly and downwardly curved relative to said extension and sloping upwardly from the curved forward edges to the relatively straight rearward edges.

2. In a garden cultivator and weeder, a generally rectangular shoe plate adapted to slide over the surface of the ground and having longitudinal side edges, said shoe plate having a forward end and a rearward end, a longitudinal extension on the rearward end of said shoe plate, said extension being narrower than said shoe plate and having side edges spaced laterally inwardly from the side edges of the shoe plate, shovels on said side edges of said extension, said shovels having convexly and rearwardly curved forward edges and relatively straight rearward edges, said shovels projecting laterally outwardly from the side edges of the extension, said shovels being laterally outwardly and downwardly curved relative to said extension and sloping upwardly from the curved forward edges to the relatively straight rearward edges, said shovels being substantially triangular forms with their base sides connected to and merging into the side edges of the extension.

3. In a garden cultivator and weeder, a generally rectangular shoe plate adapted to slide over the surface of the ground and having longitudinal side edges, said shoe plate having a forward end and a rearward end, a longitudinal extension on the rearward end of said shoe plate, said extension being narrower than said shoe plate and having side edges spaced laterally inwardly from the side edges of the shoe plate, shovels on said side edges of said extension, said shovels having convexly and rearwardly curved forward edges and relatively straight rearward edges, said shovels projecting laterally outwardly from the side edges of the extension, said shovels being laterally outwardly and downwardly curved relative to said extension and sloping upwardly from the curved forward edges to the relatively straight rearward edges, said shovels being substantially triangular forms with their base sides connected to and merging into the side edges of the extension, opposite side edges of the extension being parallel to each other and shovels thereon being aligned with each other crosswise of the extension.

References Cited in the file of this patent

UNITED STATES PATENTS

| | | |
|---|---|---|
| 397,735 | Mansfield | Feb. 12, 1889 |
| 1,666,374 | Gatti | Apr. 17, 1928 |
| 1,966,536 | Bevis | July 17, 1934 |
| 2,006,672 | Combs | July 2, 1935 |
| 2,010,303 | Hopley | Aug. 6, 1935 |
| 2,030,424 | Bacigalupi | Feb. 11, 1936 |
| 2,076,120 | Cyganick | Apr. 6, 1937 |
| 2,387,748 | Cuddigan et al. | Oct. 30, 1945 |

FOREIGN PATENTS

| | | |
|---|---|---|
| 466,397 | Germany | Oct. 5, 1928 |
| 220,830 | Great Britain | Aug. 28, 1924 |
| 224,477 | Great Britain | Nov. 13, 1924 |